(12) United States Patent
Bär

(10) Patent No.: US 7,367,770 B2
(45) Date of Patent: May 6, 2008

(54) RETRACTABLE TAIL-LIFT FOR A VEHICLE

(76) Inventor: Gerd Bär, Zueckwolfstrasse 17/1, D-74078 Heilbronn (DE)

( * ) Notice: Subject to any disclaimer, the term of this patent is extended or adjusted under 35 U.S.C. 154(b) by 162 days.

(21) Appl. No.: 10/530,906

(22) PCT Filed: Oct. 16, 2003

(86) PCT No.: PCT/EP03/11450

§ 371 (c)(1),
(2), (4) Date: Apr. 8, 2005

(87) PCT Pub. No.: WO2004/037606

PCT Pub. Date: May 6, 2004

(65) Prior Publication Data

US 2006/0045706 A1    Mar. 2, 2006

(30) Foreign Application Priority Data

Oct. 26, 2002  (EP) .................................. 02024002

(51) Int. Cl.
*B60P 1/44* (2006.01)
(52) U.S. Cl. ...................................... 414/558; 414/549
(58) Field of Classification Search ............... 414/541, 414/545, 549, 556, 558, 522
See application file for complete search history.

(56) References Cited

U.S. PATENT DOCUMENTS

| | | | | |
|---|---|---|---|---|
| 3,351,220 A | * | 11/1967 | Kirkbride | 414/541 |
| 3,587,883 A | * | 6/1971 | Neely, Jr. | 414/549 |
| 3,599,810 A | * | 8/1971 | Wanko | 414/558 |
| 4,579,503 A | * | 4/1986 | Disque | 414/558 |
| 4,958,979 A | * | 9/1990 | Svensson | 414/549 |
| 5,253,973 A | | 10/1993 | Fretwell | |

FOREIGN PATENT DOCUMENTS

| | | | |
|---|---|---|---|
| EP | 0 629 524 A1 | | 12/1994 |
| EP | 0 662 405 A1 | | 7/1995 |
| GB | 2207113 | * | 1/1989 |
| JP | 57-182536 | * | 11/1982 |
| JP | 60-1045 | * | 1/1985 |
| JP | 08150869 | | 6/1996 |

OTHER PUBLICATIONS

Patent Abstracts of Japan, vol. 1996, No. 10, Oct. 31, 1996 & JP 08 150869 A (NIPPON RIFUTO KK Jun. 11, 1996).
Fa.Trösch AG: "Betriebsanleitung Trösch Cargolift Hydfalt 3" Jul. 2002, XP002232265.

* cited by examiner

*Primary Examiner*—James Keenan
(74) *Attorney, Agent, or Firm*—Walter A. Hackler

(57) ABSTRACT

A retractable tail-lift for a vehicle comprises a lifting mechanism (30) for lifting and lowering a platform (50), and guiding rails (21) in which the lifting mechanism (30) with one vertical carriage (32) each is suspended and can be slidably displaced between a working position located behind the vehicle and a travelling position located below the vehicle, wherein each carriage (32) has a front guiding element (40*a*) with an upper sliding member (42*a*) and rear guiding element (40*b*) with a lower sliding member (42*b*). The front guiding element (40*a*) is attached from above onto the carriage (32) and is arrested on the carriage (32) at right angles to the direction of attachment, and the rear guiding element (40*b*) is attached from below onto the carriage (32) in an opening (32.3) of the carriage (32) and is arrested on the carriage (32) at right angles to the direction of attachment.

10 Claims, 3 Drawing Sheets

RETRACTABLE TAIL-LIFT FOR A VEHICLE

BACKGROUND OF THE INVENTION

A retractable tail-lift of this type is disclosed e.g. by the Hydfalt 3 model range of the company Gerd Bär GmbH, Heilbronn.

Tail-lifts are mounted to lorries or trailers for loading and unloading them. Retractable tail-lifts are mounted to the chassis using a guiding mechanism and can be retracted completely under the body or chassis frame after folding the platform once or twice, such that they do not project at any location to the rear beyond the body to prevent any disturbance. Retractable tail-lifts of this type are used for vehicles with interchangeable bodies and for all vehicles which must dock onto loading/unloading regions of cold storage houses.

In the Hydfalt 3 model range, the guiding mechanism is formed by two guiding rails in which the lifting mechanism with one vertical carriage each is suspended, and can be slidably moved between the working position located behind the vehicle and the driving position located below the vehicle. Each carriage comprises a front guiding element with an upper sliding member which abuts on an upper guiding surface of the guiding rail, and a rear guiding element with a lower sliding member which abuts on a lower guiding surface of the guiding rail. The guidance is disposed inside the guiding rails to protect the guiding surfaces from dirt. The guiding rail may also be mounted at any location to the vehicle or to cross members, which facilitates dimensioning of the guiding rail. This technology also provides maintenance-free sliding guidance if the sliding partners are appropriately selected. These sliding guidances have the object to adopt the net weight of the lifting mechanism and the platform and slidingly transfer it to the guiding element during folding and unfolding. The guiding elements also have the object to assume horizontal guidance during forward and backward movement. The centrally acting displacement cylinder and the irregular friction must simultaneously provide horizontal guidance. The unfavorable leverages—the separation of the guiding elements and the center of gravity of the tail-lift—also produce large horizontal guiding forces. Since the sliding materials, which consist substantially of plastic material or plastic composite material, are subjected to wear, the sliding members of the Hydfalt 3 model range are suspended on the carriage to obtain even wear. Towards this end, the symmetric guiding construction has guiding elements of aluminium for the tension side as well as the pressure side on both sides of the carriage plate. This guiding elements comprise chambers which are open towards the bottom for receiving the sliding elements, and are commonly borne by a specially disposed bolt which penetrates through the carriage plate. This construction requires relatively high precision and expensive measures to protect the support and bolt from rust. Guiding surface is wasted on the pressure side of the carriage in the region of the carriage plate thickness. With this construction, the forces are deviated through the bolt into the carriage plate, thereby producing a very large internal bore surface which necessitates great material solidity. The carriage plate thickness must nevertheless be excessively thick. This conventional construction is therefore technically very demanding and therefore expensive.

SUMMARY OF THE INVENTION

Servicing of the inventive construction is extremely easy. Changing of the sliding members is very simple and requires no connecting means. Removal of the guiding elements, replacing the sliding members, and reinsertion are facilitated. Faults caused by untrained staff are almost impossible. The same applies for initial assembly.

BRIEF DESCRIPTION OF THE DRAWINGS

Further advantages of the invention can be extracted from the description and the drawing. The features mentioned above and below may be used individually or in arbitrary combination. The embodiment shown and described is not to be understood as exhaustive enumeration but has exemplary character for describing the invention.

DETAILED DESCRIPTION

Figure 1:
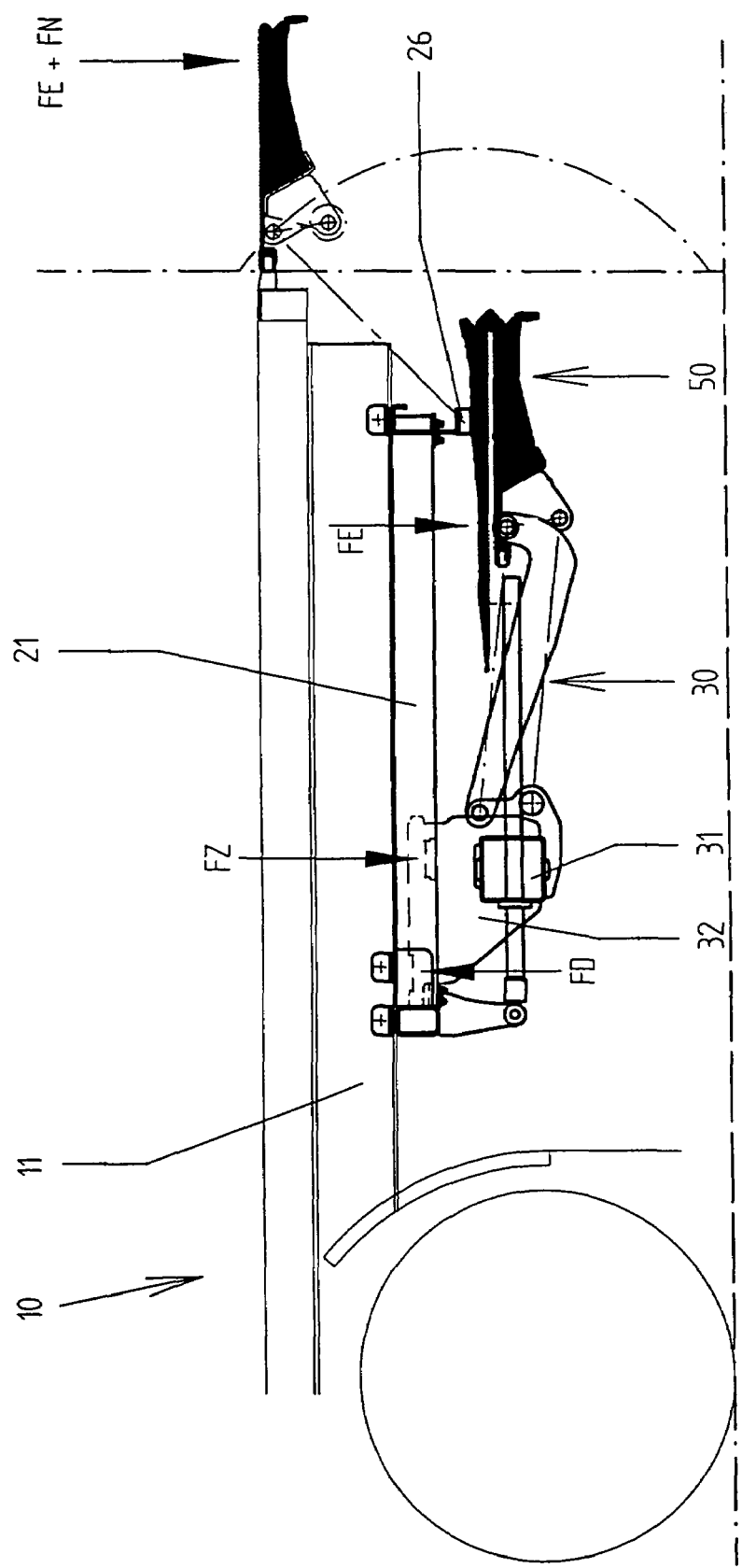
FIG. 1 shows a side view of the retractable tail-lift in its retracted travelling position and in its extended working position.

FIG. 1 shows the tail-lift in its retracted travelling position, with folded platform 50, installed on the rear of a trailer 10. The lifting mechanism 30 with platform 50 is connected to the trailer 10 via guiding elements 40a, 40b (FIG. 2) in the region FZ and FD using two guiding rails 21. The center of gravity of the net weight of lifting mechanism 30 and platform 50 is in the region of FE. This force generates the tractive force in FZ and the compressive force in FD.

In the working position of the tail-lift, shown in broken view, the net weight FE and the useful load FN act on the platform 50, which generate the largest forces in FZ and FD in this case. During stowage, the lifting mechanism 30 with folded platform 50 is moved into the travelling position. The support arms and platform 50 remain below the level of the rubber buffers 26. The platform 50 is subsequently lifted against the rubber buffers 26 using the lifting function to clamp the tail-lift. This increases of course the forces acting in FZ and FD.

Figure 2:
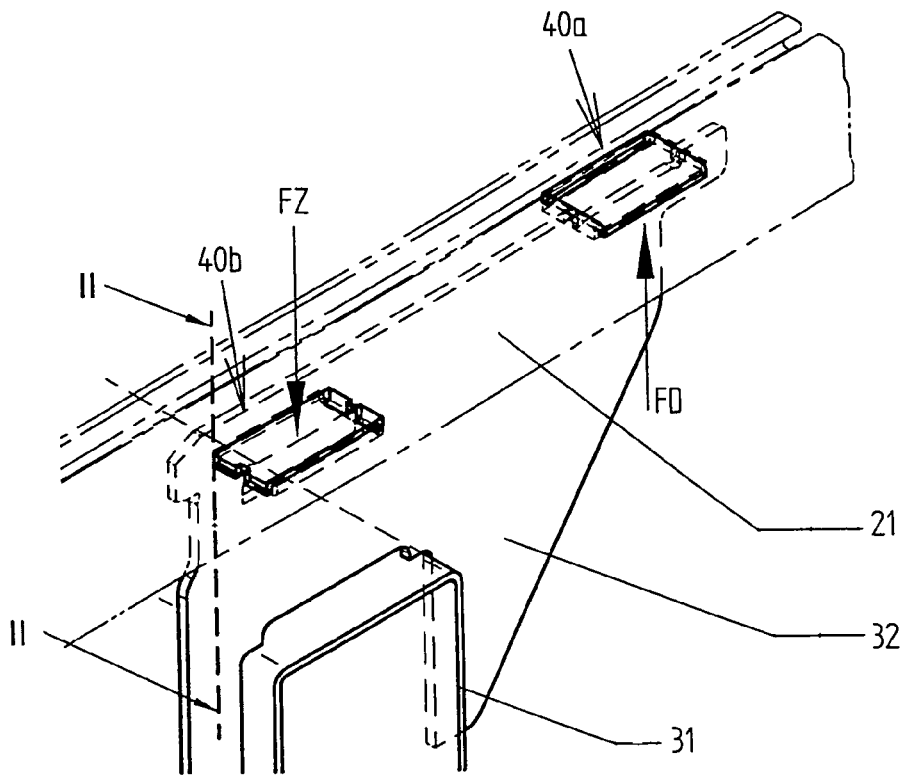
FIG. 2 shows a carriage which can be displaced in a guiding rail, of the underridable elevating platform of FIG. 1.

FIG. 2 shows part of the support tube 31 with vertical carriage plate 32 in the guiding rail 21 shown with dashed lines. The region FZ shows the position of the guiding element 40b. In the region FD, the front guiding element 40a is supported on the recess 32.5 (FIG. 3) which is open to the top of the carriage 32. In the region FZ, the rear guiding element 40b penetrates through the carriage 32 in the region of the opening 32.3 (FIG. 4). In the region FD, the arrangement and the force transmission are analog to FZ, however, with the difference, that the recess 32.5 opens to the top.

Figure 3:
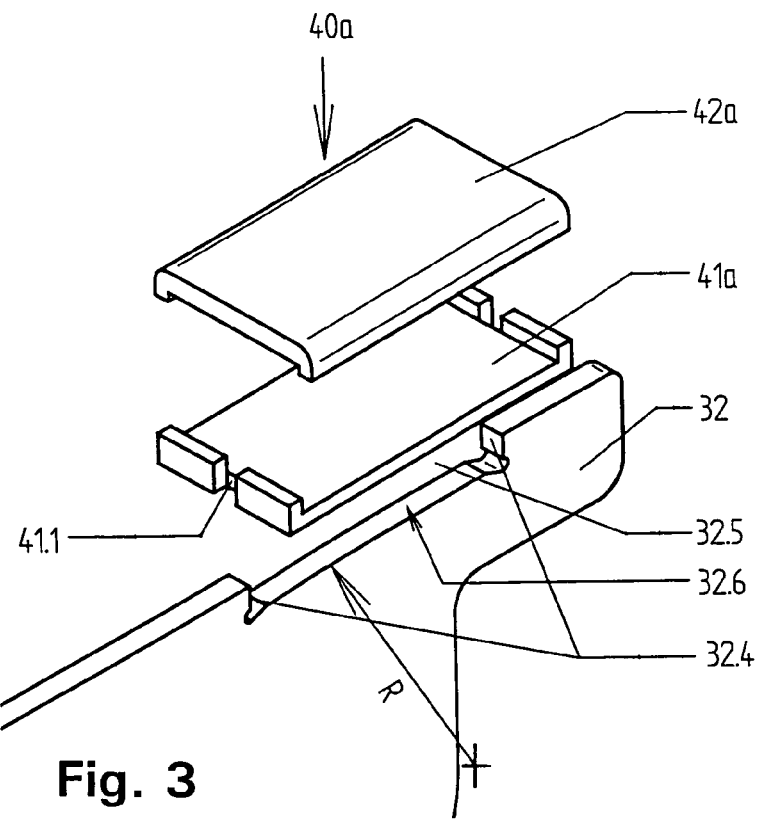
FIG. 3 shows a detailed view of the carriage of FIG. 2 in the region of a front guiding element.
Figure 4:
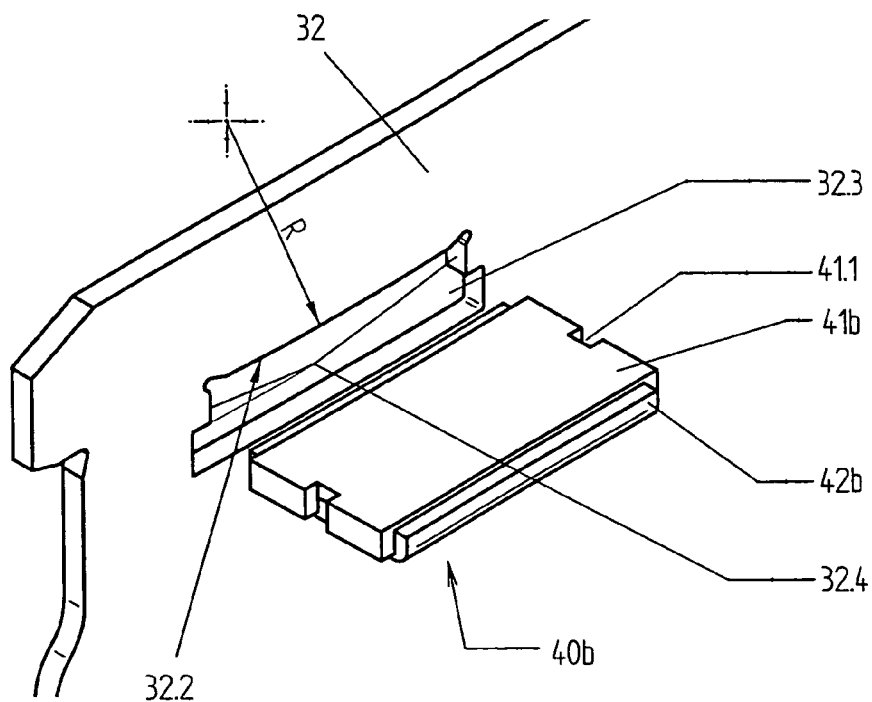
FIG. 4 shows a detailed view of the carriage of FIG. 2 in the region of a rear guiding element.

FIG. 3 shows the front guiding element 40a which consists of the sliding member carrier 41a and the sliding member 42a which positively engage each other. The front sliding member carrier 41a is loosely attached from above onto the plate-shaped carriage 32, is guided thereon in a vertically displaceable manner and is disposed to be tilted due to sufficient play. Towards this end, the sliding member carrier 41a has guiding recesses 41.1 on its front end, which extend over the vertical surface 32.4 of the carriage 32. The force is transmitted to the sliding member carrier 41*a* in the region FD via the radius-shaped abutment surface 32.6 of the recess 32.5 which is convexly curved (radius R) into the recess 32.5. The forces are transmitted in a planar manner from the sliding member carrier 41*a* to the sliding member 42*a* and from the sliding member 42*a* to the upper sliding path 21.2 (FIG. 5) of the guiding rail 21. The sliding member carrier 41*a*, viewed transversely to the guiding direction of the carriage 32, and the sliding member 42*a*, viewed in the guiding direction of the carriage 32, each have a U-shaped cross-section and positively engage each other over their full surfaces.

FIG. 4 shows the rear guiding element 40*b* which consists of the sliding member carrier 41*b* and the sliding member 42*b*. The rear sliding member carrier 41*b* penetrates through the carriage 32 in the opening 32.3 which must be sufficiently large to permit mounting of the sliding member carrier 41*b* including sliding member 42*b*. The rear sliding member carrier 41*b* is loosely attached from below onto the plate-shaped carriage 32 and can be displaced thereon in a vertical direction and can also be tilted due to sufficient play. Towards this end, the sliding member carrier 41*b* has guiding recesses 41.1 on its front end which extend over the vertical surface 32.4 of the carriage 32. The force is transmitted to the sliding member carrier 41*b* in the region FZ through the radius-shaped abutment surface 32.3 of the opening 32.2 which is convexly curved (radius R) into the opening 32.3. The forces are transmitted in a planar manner from the sliding member carrier 41*b* to the sliding member 42*b* and from the sliding member 42*b* to the lower sliding path 21.1 (FIG. 5) of the guiding rail 21. The sliding member carrier 41*b*, viewed transversely to the guiding direction of the carriage 32, and the sliding member 42*b*, viewed in the guiding direction of the carriage 32, each have a U-shaped cross-section and positively engage each other over their full surfaces.

Figure 5:
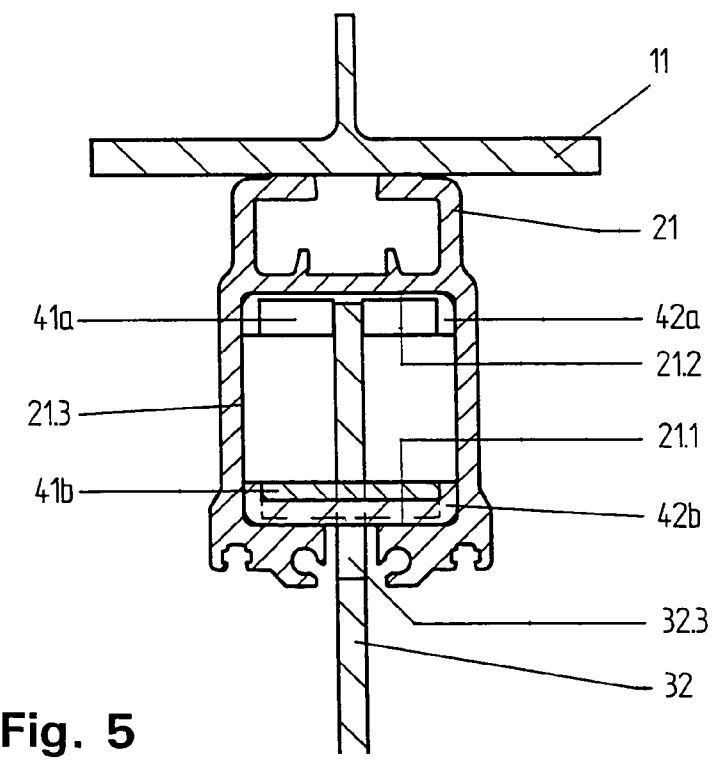
FIG. 5 shows a sectional view in accordance with II-II of FIG. 2.

FIG. 5 shows a section through the longitudinal carrier 11 of the trailer 10, the carriage 32 and the guiding rail 21 in the region between FZ and FD. It is clearly shown that the guiding elements 40*a*, 40*b* guide the carriage 32 via the sliding members 42*a*, 42*b* and the sliding member carrier 41*a*, 41*b* in a vertical direction on the lower sliding path 21.1 and also on the upper sliding path 21.2. The horizontal guidance is obtained by the vertical surfaces of the sliding members 42 on the vertical inner surfaces 21.3 of the guiding rail 21. The horizontal guiding forces are transmitted from the sliding member 42 to the sliding member carrier 41 through positive engagement of these two parts. The positive connection of the guiding elements 40 and the carriage 32 is obtained through positive engagement of the guiding recesses 41.1 which extend over the vertical surface 32.4 (FIGS. 3, 4) of the carriage 32. In the embodiment shown, the two sliding member carriers 41*a*, 41*b* and their sliding members 42*a*, 42*b* have the same design.

This carriage guidance requires a minimum number of components which cannot be reduced. The laser-cut carriage 32 can be connected to the support tube 31 through welding. The guiding elements 40 can be easily inserted due to their positive shape before assembly with the guiding rail 21. The guiding elements 40 connect the lifting mechanism 30 and the platform 50 to the guiding mechanism 20. The sliding member carriers 41 are simple milled parts of normal constructional steel. The carriage 32 itself is produced from high-tensile fine-grained steel. The sliding member 42 is connected to the sliding member carrier 41 also through pure positive locking in all directions of force without any connecting means. The radius-shaped surfaces 32.2, 32.6 in the opening 32.3 and in the recess 32.5 ensure full-surface abutment of the sliding members 42 on the lower sliding path 21.1 and upper sliding path 21.2 through tilting of the sliding member carriers 41*a*, 41*b*. Even when the sliding members 42 are worn, uniform surface pressure between sliding member 42 and the lower sliding path 21.1 and upper sliding path 21.2 is ensured.

If the material has been appropriately selected, e.g. high-tensile fine-grained steel on the carriage 32 and a relatively soft constructional steel on the sliding member carrier 41, the material will flow when the material strength has been exceeded until the surface has enlarged to a sufficient degree such that the material can adopt the forces. This process occurs in magnitudes of far less than a millimeter and therefore has no effect on the function. The same applies for inaccuracies produced by the support tube 31 and the carriage 32. Deviations from the right angle in the horizontal plane caused by production can be compensated for in the same manner.

The invention claimed is:

1. Tail-lift for a vehicle, said tail-lift comprising:
    a lifting mechanism for lifting and lowering a platform;
    left and right side guiding rails on which the lifting mechanism is suspended with a left plate-shaped vertical carriage depending from the left guiding rail, and a right plate-shaped vertical carriage depending from the right guiding rail, the left and right carriages being slidably displacable between a working position located behind the vehicle and a traveling position located below the vehicle;
    left and right front guiding elements each with upper sliding members, the left front guiding element being attached into a recess of the left carriage at a right angle to the left carriage and the right front guiding element being attached into a recess of the right carriage at a right angle to the right carriage, the recesses opening to top edges of the left and right carriages; and
    left and right rear guiding elements each with lower sliding members, the left rear guiding element being attached into an opening of the left carriage and disposed on the left carriage at a right angle to the left carriage and the right rear guiding element being attached into an opening of the right carriage and disposed on the right carriage at a right angle to the right carriage.

2. Tail-lift according to claim 1, wherein each front guiding element is tiltably disposed and is vertically displaceable with respect to the corresponding carriage.

3. Tail-lift according to claim 2, wherein each carriage comprises an abutment surface cooperating with a sliding member of a corresponding front guiding element, each abutment surface being convexly curved.

4. Tail-lift according to claim 1, wherein each rear guiding element is tiltably disposed in a corresponding carriage opening and is vertically displaceable with respect to the corresponding carriage.

5. Tail-lift according to claim 1, wherein each carriage comprises an abutment surface cooperating with the sliding member of a corresponding rear guiding element, each abutment surface being convexly curved.

6. Tail-lift according to claim 1, wherein the front and rear guiding elements project beyond both sides of the carriage.

7. Tail-lift according to claim 1, wherein a sliding member of the front and rear guiding elements has a U-shaped cross-section.

8. Tail-lift according to claim 7, further comprising front sliding member carriers and rear sliding member carriers each having a U-shaped cross-section, each sliding member carrier and corresponding sliding member being rotated by 90° with respect to one another and abut one another over entire surfaces thereof.

9. Tail-lift according to claim 1, further comprising front and rear sliding member carriers for holding the upper and lower sliding members respectively.

10. Tail-lift according to claim 9, wherein the front sliding member carrier and the rear sliding member carrier each have a U-shaped cross-section and the sliding member carriers and corresponding sliding members are disposed at 90° with respect to one another and abut one another over entire surfaces thereof.

\* \* \* \* \*